(12) United States Patent  (10) Patent No.: US 8,464,858 B2
Kirschner et al.                (45) Date of Patent:     Jun. 18, 2013

(54) CONVEYOR BELT SCRAPER AND SYSTEM FOR THE SAME

(75) Inventors: James B. Kirschner, Moundsville, WV (US); Bruce T. Cleevely, Middletown, PA (US); R. Anthony Cook, Wheeling, WV (US); William Thomas Bland, Wheeling, WV (US)

(73) Assignee: Cabin Creek Inc., Triadelphia, WV (US)

( * ) Notice: Subject to any disclaimer, the term of this patent is extended or adjusted under 35 U.S.C. 154(b) by 181 days.

(21) Appl. No.: 13/045,151

(22) Filed: Mar. 10, 2011

(65) Prior Publication Data

US 2011/0220461 A1    Sep. 15, 2011

Related U.S. Application Data

(60) Provisional application No. 61/313,320, filed on Mar. 12, 2010, provisional application No. 61/383,575, filed on Sep. 16, 2010.

(51) Int. Cl.
    *B65G 45/16* (2006.01)
(52) U.S. Cl.
    USPC ........................................... 198/499
(58) Field of Classification Search
    USPC ................................ 198/497, 499
    See application file for complete search history.

(56) References Cited

U.S. PATENT DOCUMENTS

| | | | |
|---|---|---|---|
| 4,850,474 A * | 7/1989 | Schwarze | 198/499 |
| 4,962,845 A | 10/1990 | Gibbs | |
| 5,197,587 A | 3/1993 | Malmberg | |
| D347,918 S | 6/1994 | Gibbs | |
| 5,573,102 A | 11/1996 | Puchalla | |
| 5,647,476 A | 7/1997 | Veenhof | |
| 5,692,595 A | 12/1997 | Gilbert | |
| 5,797,477 A | 8/1998 | Veenhof | |
| 5,979,638 A | 11/1999 | Wiggins | |
| 6,279,727 B1 | 8/2001 | Waalkes et al. | |
| 6,315,105 B1 | 11/2001 | Gibbs et al. | |
| 6,619,469 B2 | 9/2003 | Malmberg | |
| D482,508 S | 11/2003 | DeVries | |
| 6,843,363 B2 | 1/2005 | Schwarze | |
| 6,926,133 B2 * | 8/2005 | Kolodziej et al. | 198/498 |
| 6,929,112 B2 | 8/2005 | Hall | |

(Continued)

FOREIGN PATENT DOCUMENTS

| | | |
|---|---|---|
| EP | 0847942 A1 | 6/1998 |
| WO | 03074393 A1 | 9/2003 |

OTHER PUBLICATIONS

"Blue Max Belt Scraper", Cabin Creek Brochure, Oct. 19, 2009., 3 pages, Triadelphia, West Virginia.

*Primary Examiner* — James R Bidwell
(74) *Attorney, Agent, or Firm* — The Webb Law Firm

(57) ABSTRACT

A scraper blade has a tip of hard material and a base of resilient material. The base has at least one concave surface on the front side adjacent to the base and may have an additional concave surface on the back side adjacent to the tip. When the blade is urged against a conveyor belt for removing material, a substantial vertical force created by a significant obstruction on the belt will compress the scraper blade and will cause the blade to deform and move away from the belt until the obstruction has passed. A scraper blade system includes the scraper blade and an adjustment block for holding and adjusting the scraper blade against the conveyor belt.

37 Claims, 17 Drawing Sheets

U.S. PATENT DOCUMENTS

| | | |
|---|---|---|
| 6,948,609 B2 | 9/2005 | Finger et al. |
| 6,991,088 B1 | 1/2006 | Smith et al. |
| 7,004,304 B1 | 2/2006 | Smith et al. |
| 7,007,794 B2 | 3/2006 | Waters et al. |
| 7,051,862 B1 | 5/2006 | Smith et al. |
| 7,083,040 B2 | 8/2006 | Finger et al. |
| 7,225,916 B2 | 6/2007 | Yoshizako et al. |
| D547,523 S | 7/2007 | Swinderman |
| 7,370,750 B2 | 5/2008 | Swinderman |
| 7,383,940 B1 | 6/2008 | Stumpf, Jr. et al. |
| 7,428,960 B2 | 9/2008 | Hall |
| D594,623 S | 6/2009 | Felton |
| 7,549,532 B2 | 6/2009 | Ostman |
| 7,556,140 B2 | 7/2009 | Swinderman et al. |
| 2004/0188224 A1 | 9/2004 | Kolodziej et al. |
| 2008/0053791 A1 | 3/2008 | Swinderman et al. |
| 2008/0179168 A1 | 7/2008 | Swinderman |
| 2009/0053791 A1 | 2/2009 | Schultz et al. |
| 2009/0078538 A1 | 3/2009 | Swinderman et al. |
| 2009/0078539 A1 | 3/2009 | Swinderman et al. |
| 2009/0133990 A1 | 5/2009 | Metzner |
| 2009/0294252 A1 | 12/2009 | Swinderman et al. |
| 2010/0126832 A1 | 5/2010 | DeVries |

* cited by examiner

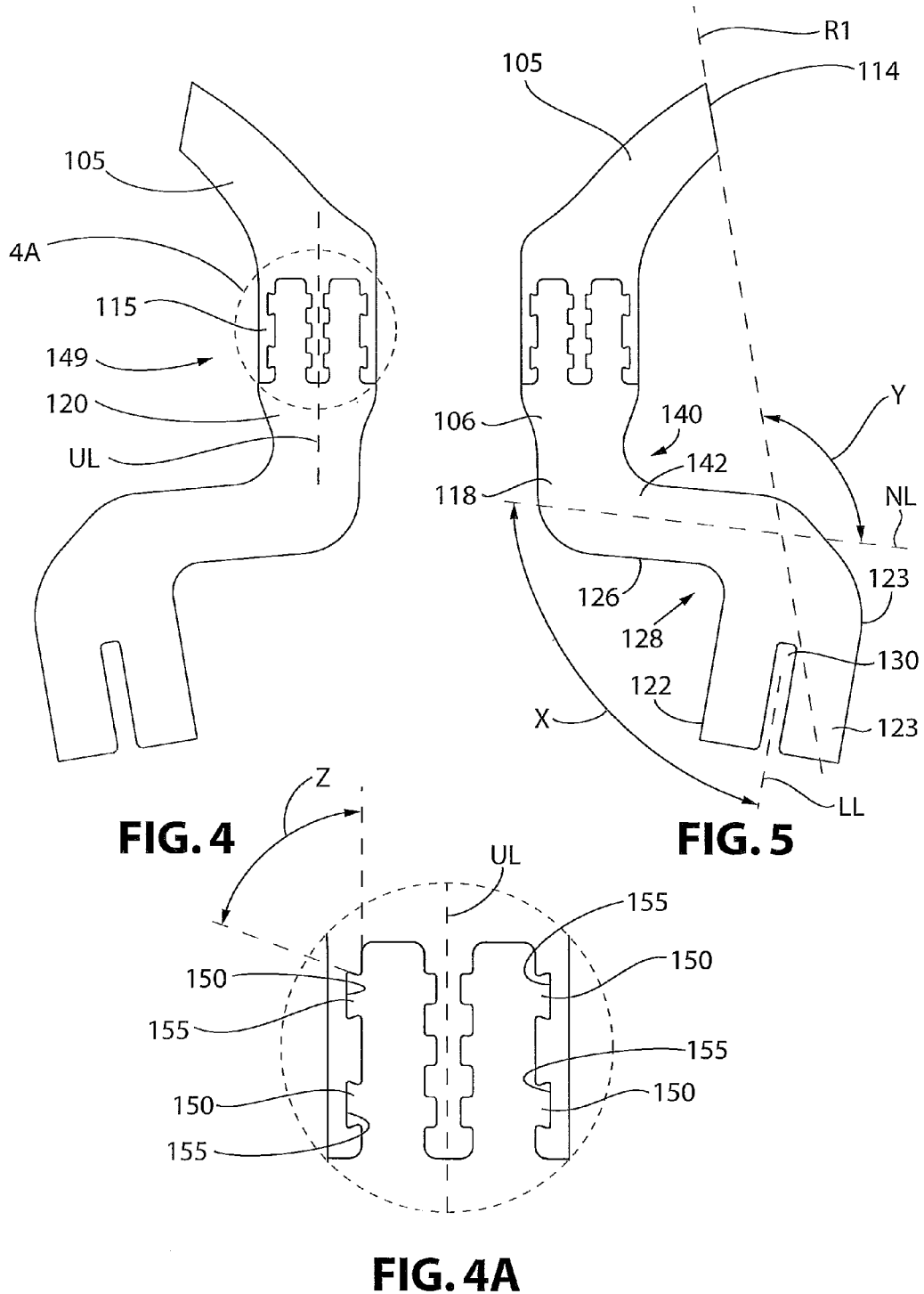

CONVEYOR BELT SCRAPER AND SYSTEM FOR THE SAME

CROSS REFERENCE TO RELATED APPLICATIONS

This application claims the benefit of U.S. Provisional Application No. 61/313,320 filed Mar. 12, 2010 and U.S. Provisional Application No. 61/383,575 filed Sep. 16, 2010.

This application hereby incorporates by reference the contents of U.S. Provisional Application No. 61/313,320 filed Mar. 12, 2010 and U.S. Provisional Application No. 61/383,575 filed Sep. 16, 2010.

BACKGROUND OF THE INVENTION

1. Field of the Invention

The present invention is directed to a belt scraper for a conveyor system.

2. Description of Related Art

Primary conveyor belt scraper blades are used as an initial scraping tool to remove residual material from moving conveyor belts. However, unlike secondary scraper blades, which are disposed "downstream" of the primary conveyor belt scraper blade, the primary conveyor belt scraper blade is disposed at a very aggressive angle with respect to the conveyor belt to remove a maximum amount of residual material from a conveyor belt.

However, there are at least two disadvantages associated with the currently available scraper blades. First of all, many of the scraper blades are relatively rigid and, as a result, although they are effective at cleaning the belt, they may damage the belt. Because a moving conveyor belt is not a completely smooth surface, a hardened primary conveyor belt scraper blade tends to scrape away any thickened portion or protrusion extending from the conveyor belt. For example, if the lacing between the two ends of a continuous belt protrudes from the belt, the scraper may further damage the lacing by tearing it away from the belt. Additionally, some scraper blades are relatively flexible and, while they do not damage the belt, their wear life is unacceptably short or in the event they encounter a significant obstruction on the belt, then a relatively flexible scraper blade may fold under the belt, thereby becoming ineffective. Furthermore, conveyor belt scrapers made with a relatively soft flexible material not only do not clean a conveyor belt as well, but they wear quickly.

There is a need to provide a durable conveyor belt scraper that not only effectively cleans the belt without damage but, furthermore, resists buckling under the belt during usage, thereby rendering the scraper ineffective.

SUMMARY OF THE INVENTION

One embodiment of the subject invention is directed to a scraper blade having a tip with a front face with a scraper edge, an opposing supported end, a front side, and a back side. A resilient base is attached to the tip, wherein the base has a supporting end, an anchor end, a front side, and a back side, wherein, in a relaxed state a reference line extends from the anchor end of the base to the scraper edge. The base has a curved profile with a concave bend on the back side adjacent to the anchor end of the base. In a first position, the scraper tip is rotated a predetermined amount relative to a fixed anchor end such that the resilient base is deformed and the tip exerts a force in a first direction generally perpendicular to and outwardly from the front face. In a second position, the scraper tip is compressed from the first position with a force applied to the tip in a direction generally parallel to the front face of the tip such that the base deforms in a direction along the front face and also deforms in a direction perpendicular to and inwardly from the front face.

Another embodiment of the invention is directed to a scraper blade system for removing residual material from a conveyor belt at the head pulley. The system has at least one scraper blade with a tip having a front face with a scraper edge, an opposing supported end, a front side, and a back side. A resilient base is attached to the tip, wherein the base has a supporting end, an anchor end, a front side, and a back side, wherein, in a relaxed state a reference line extends from the anchor end of the base to the scraper edge. The base has a curved profile with a concave bend on the back side adjacent to the anchor end of the base. The base also has a slot extending through the anchor end. An adjustment block is mounted to a frame, wherein the block has a connector extending therefrom which engages and supports at least one scraper blade. The connector positions each scraper blade tip against the belt at the head pulley and is angularly adjustable such that each scraper blade may be rotated to urge the scraper blade against the belt. In a first position, each scraper tip is rotated a predetermined amount relative to a fixed anchor end such that the resilient base is deformed and the tip exerts a force in a first direction generally perpendicular to and outwardly from the front face. In a second position, each scraper tip is compressed from the first position with a force applied to the tip in a direction generally parallel to the front face of the tip such that the base deforms in a direction along the front face and also deforms in a direction perpendicular to and inwardly from the front face.

BRIEF DESCRIPTION OF THE DRAWINGS

FIG. 4 is a left side view of the scraper blade illustrated in FIG. 3;

FIG. 4A is an enlargement of the area encircled in FIG. 4 and labeled 4A;

FIG. 5 is a right side view of the scraper illustrated in FIG. 3;

DESCRIPTION OF THE PREFERRED EMBODIMENTS

Figure 1:
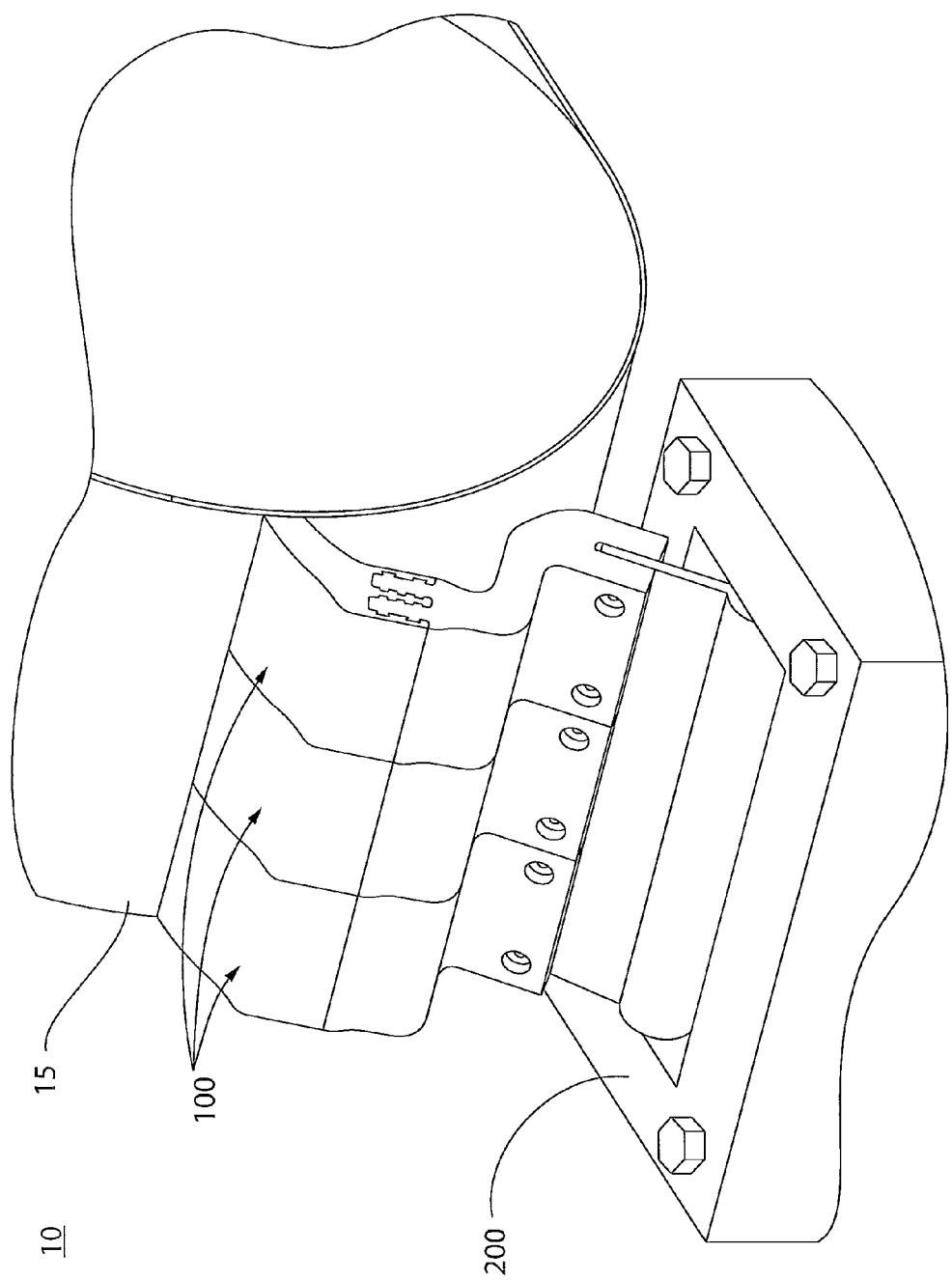
FIG. 1 is a perspective schematic view of a scraper blade system in accordance with the subject invention.
Figure 2:
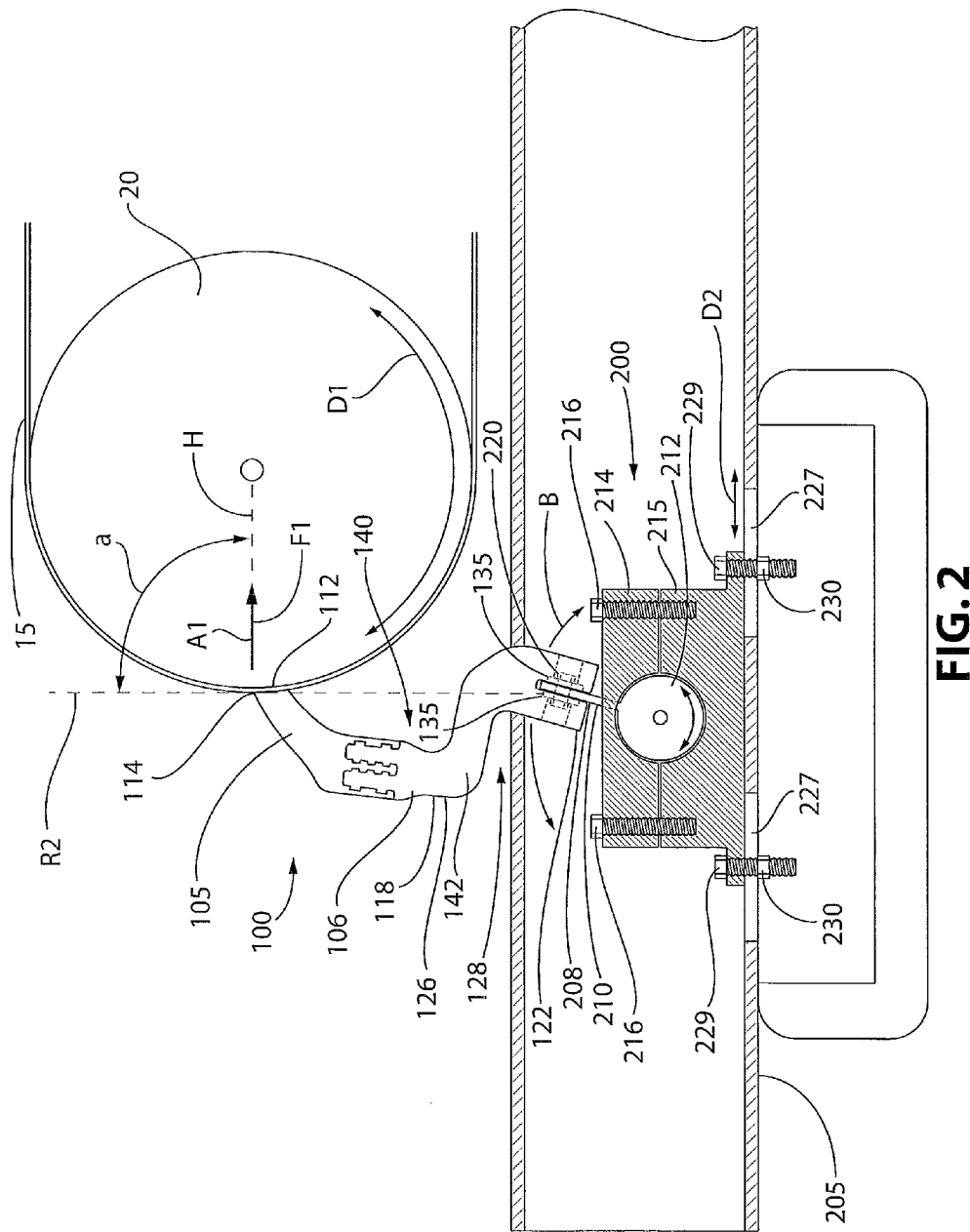
FIG. 2 is a side view of a scraper blade system in accordance with the subject invention.

FIGS. 1 and 2 illustrate a perspective view and a side view of the scraper blade system 10 for removing residual material from a conveyor belt 15 at the head pulley 20 of the system.

As illustrated in FIGS. 1 and 2, the scraper blade system may be made up of multiple scraper blades 100 abutting one another across the width of the conveyor belt 15. In the alternative, a single scraper blade having the width of the conveyor belt may be utilized, however, there are particular advantages to utilizing a series of discreet scraper blades 100 located adjacent to one another and these advantages will be discussed.

The scraper blade 100 illustrated in FIGS. 1 and 2 is similar whether it is one alone or one of multiple scraper blades across the face of the conveyor belt 15. For that reason, a single scraper blade 100 will be focused upon and discussed with the understanding that the other scraper blades 100 are similar.

Figure 3:
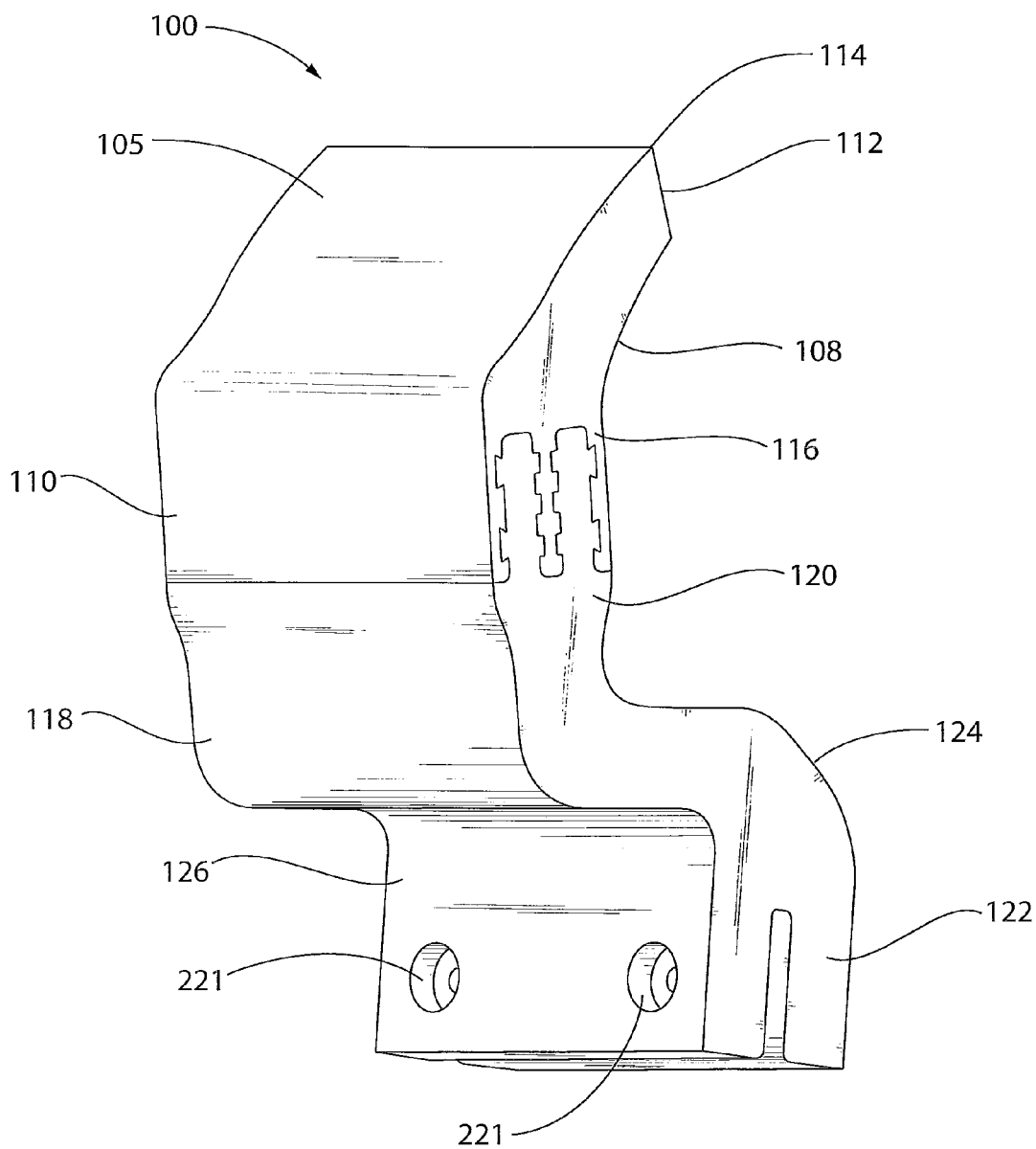
FIG. 3 is a perspective view of a single scraper blade in accordance with the subject invention.
Figure 6:
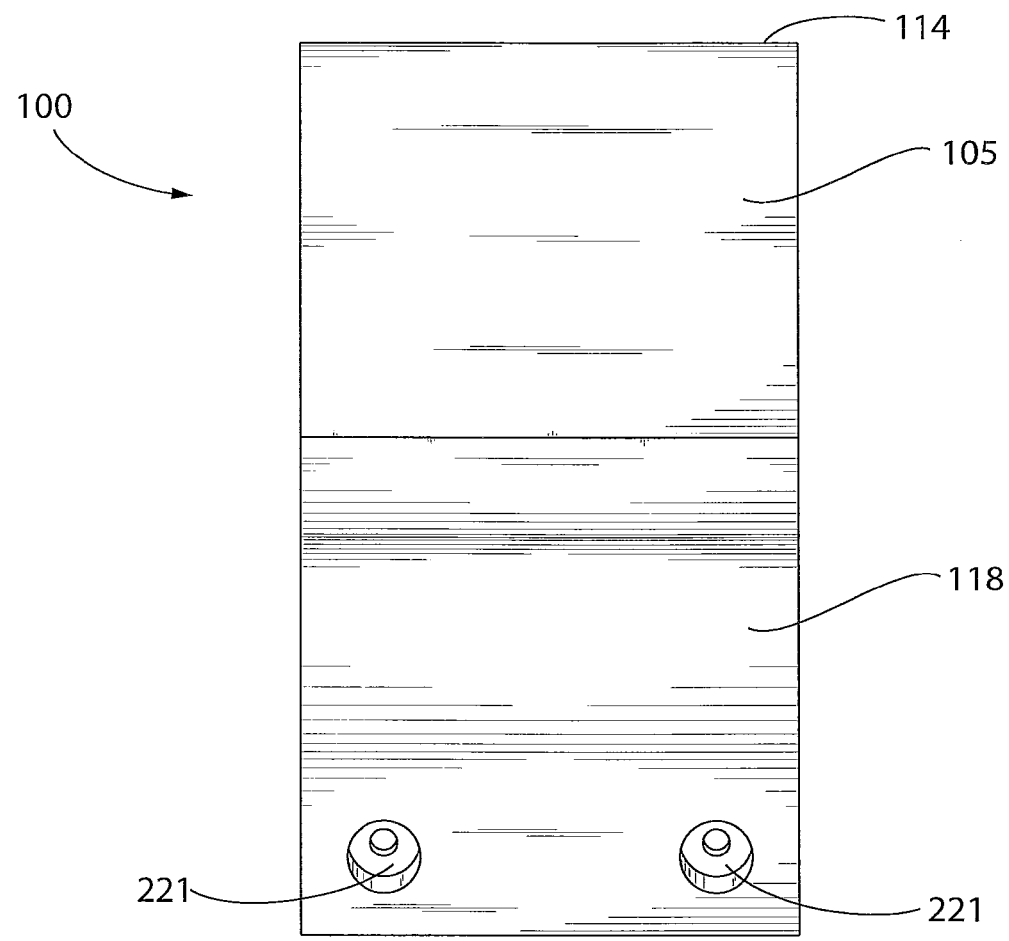
FIG. 6 is a front view of the scraper blade illustrated in FIG. 3.
Figure 7:
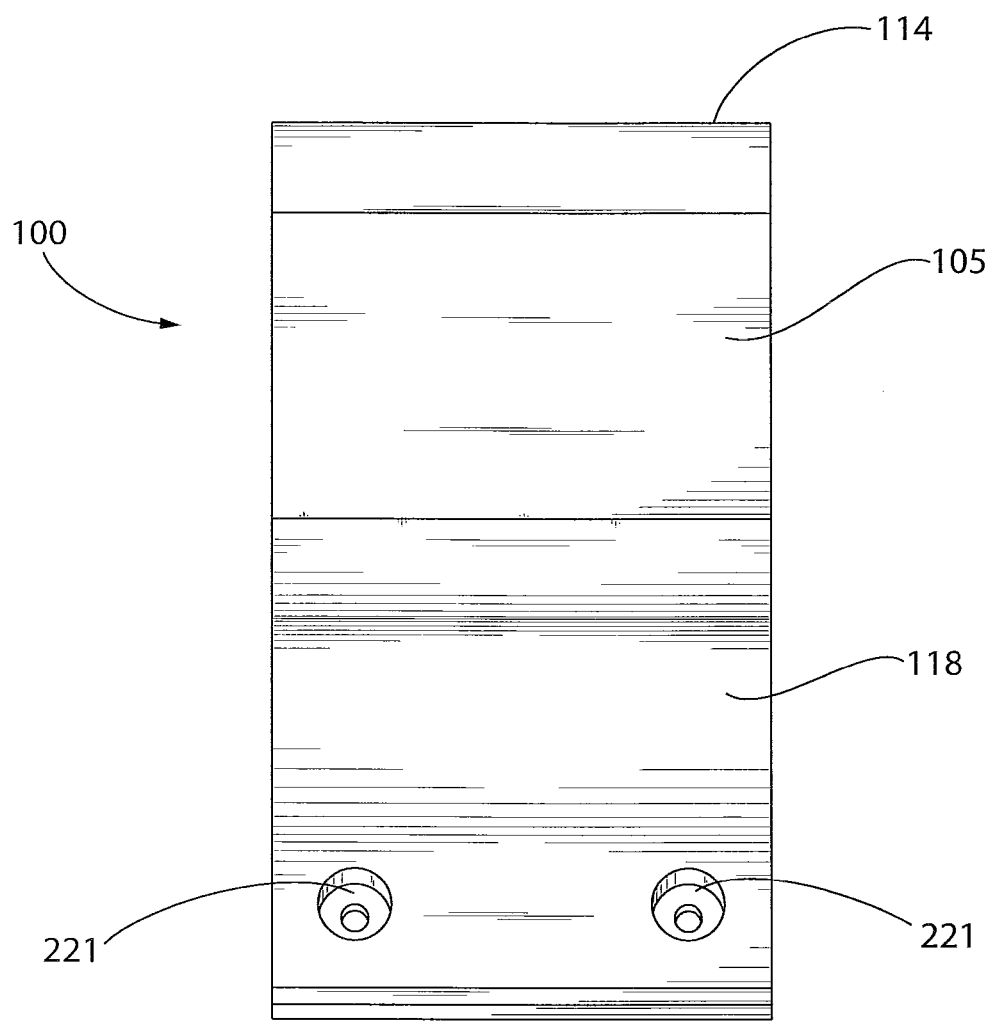
FIG. 7 is a back view of the scraper blade illustrated in FIG. 3.
Figure 8:
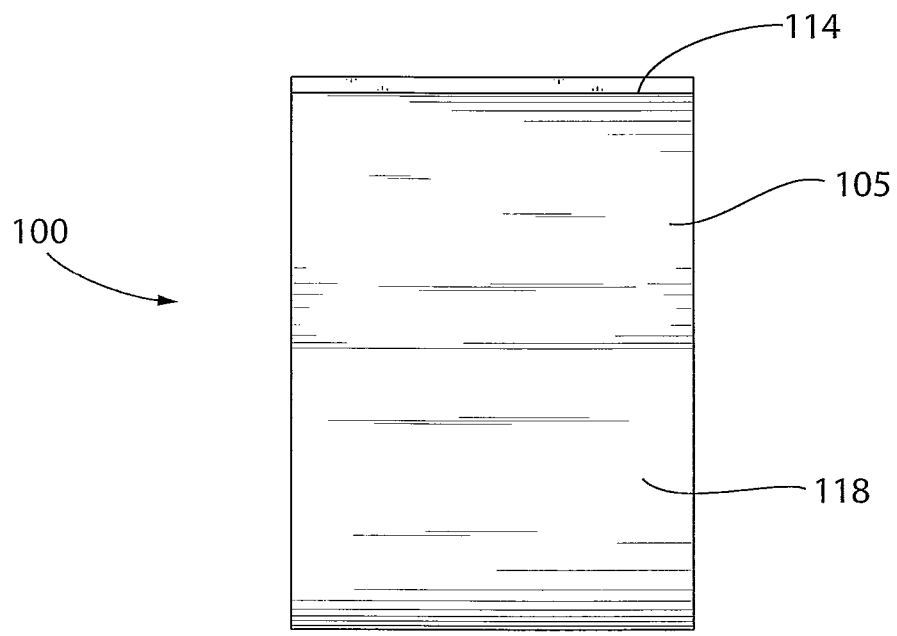
FIGS. 8 and 9 are top and bottom views, respectively, of the scraper blade illustrated in FIG. 3.
Figure 9:
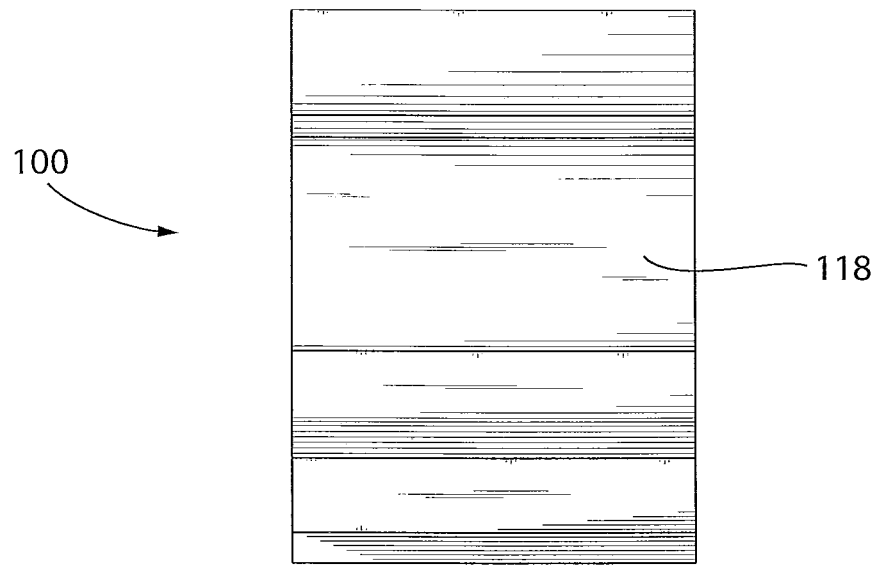

FIG. 3, just as with FIGS. 4-9, shows the scraper blade 100 in the relaxed state. Directing attention to FIG. 3, scraper blade 100 has a tip 105 with a front side 108 and a back side 110 with a front face 112 therebetween. There is a scraper edge 114 at the intersection of the back side 110 and the front face 112. The tip 105 has an opposing supported end 116.

A resilient base 118 is attached to the tip 105. The base 118 has a supporting end 120, an anchor end 122, a front side 124, and a back side 126. Directing attention to FIG. 5, in the relaxed state, a reference line R1 extends from the anchor end 122 of the base 118 to the scraper edge 114 of the tip 105. The base 118 has a curved profile with a concave bend 128 on the back side 126 adjacent to the anchor end 122 of the base 118. A slot 130 extends through the anchor end 122 of the base 118.

Returning to FIG. 2, for the scraper blade 100 to effectively remove material from the conveyor belt 15, it is necessary for the scraper edge 114 of the tip 105 to be held firmly against the conveyor belt 15. The scraper blade 100 is actually preloaded so that the scraper edge 114 applies a force between 1-25 pounds in a lateral direction as illustrated by arrow A1. Additionally, while the scraper edge 114 is the forward most part of the tip 105 to contact the conveyor belt 15, the front face 112 of the tip 105 also contributes to removing debris from the conveyor belt 15.

Directing attention to FIG. 2, an adjustment block 200 is mounted to a frame 205. The block 200 has a connector 208 which engages and supports at least one scraper blade 100. The connector 208 positions the scraper blade tip 105 against the conveyor belt 15 at the head pulley 20. As illustrated by arrow B, the connector 208 is angularly adjustable such that the scraper blade 100 may be rotated to urge the scraper blade 100 against the conveyor belt 15. FIG. 2 illustrates the scraper blade 100 in a first position, wherein the anchor end 122 is held rigidly and rotated such that the resilient base 118 is deformed and the tip 105 exerts a force F1 in a first direction illustrated by arrow A1, generally perpendicular to and outwardly from the front face 112. In this first position illustrated in FIG. 2, the anchor end 122 of the resilient base 118 is essentially fixed and the front face 112 essentially conforms to the shape of the conveyor belt 15.

Figure 10:
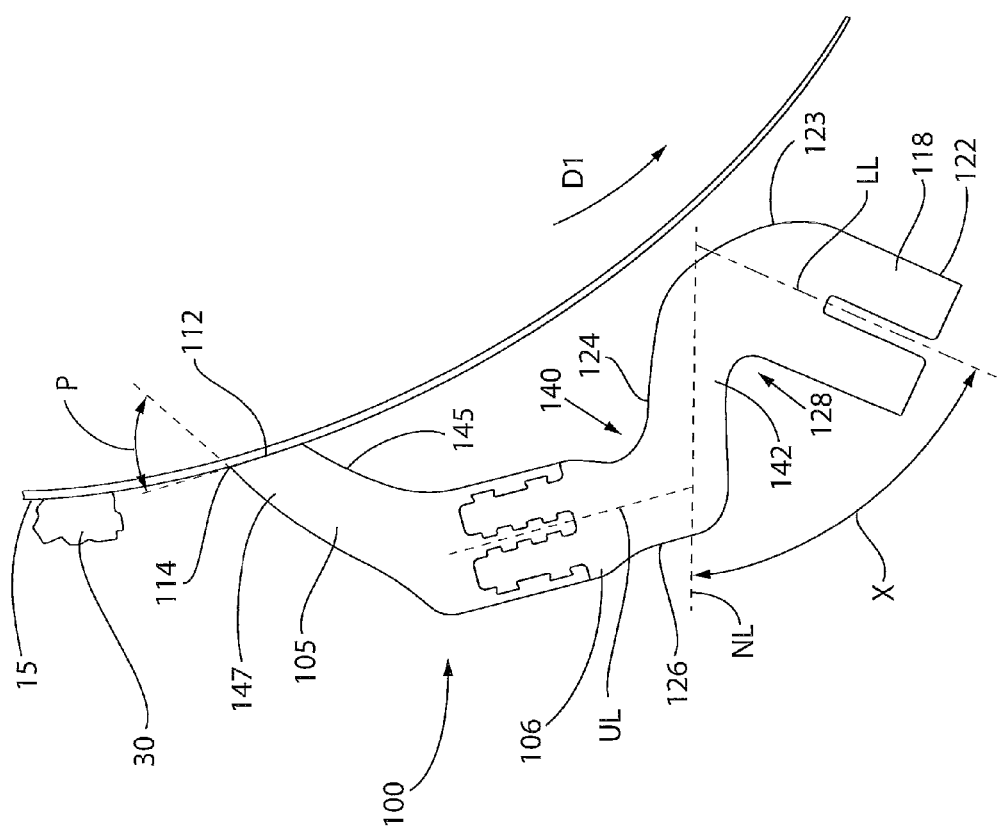
FIG. 10 is a side view of the scraper blade mounted within the system and pretensioned to provide a force against the conveyor belt.
Figure 11:
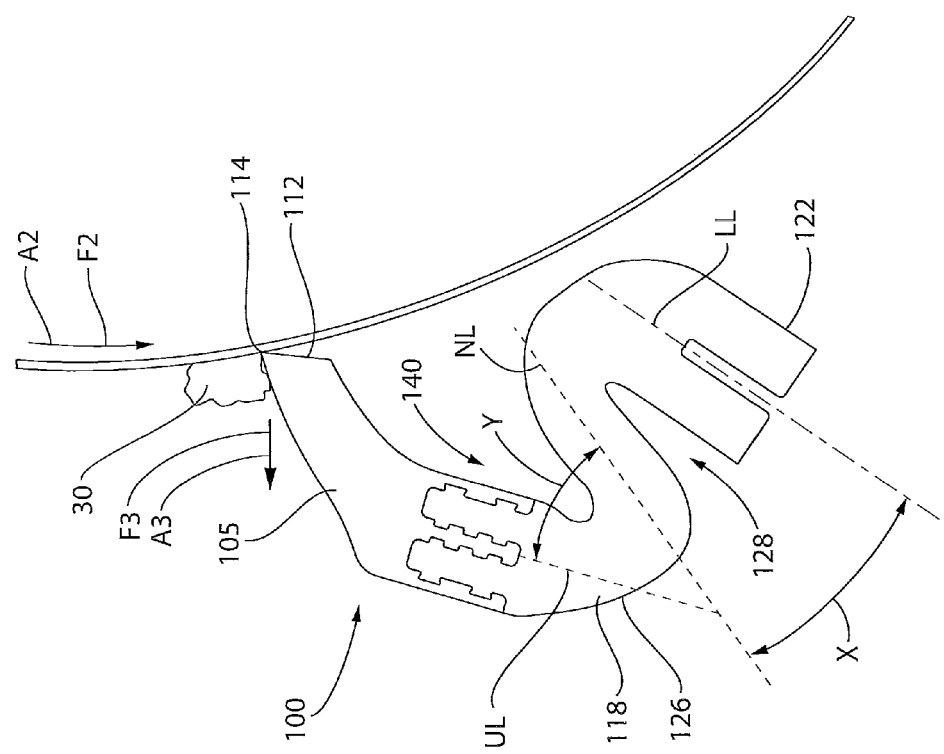
FIG. 11 is a side view of the scraper blade as it deforms upon encountering an obstacle on the conveyor belt.
Figure 12:
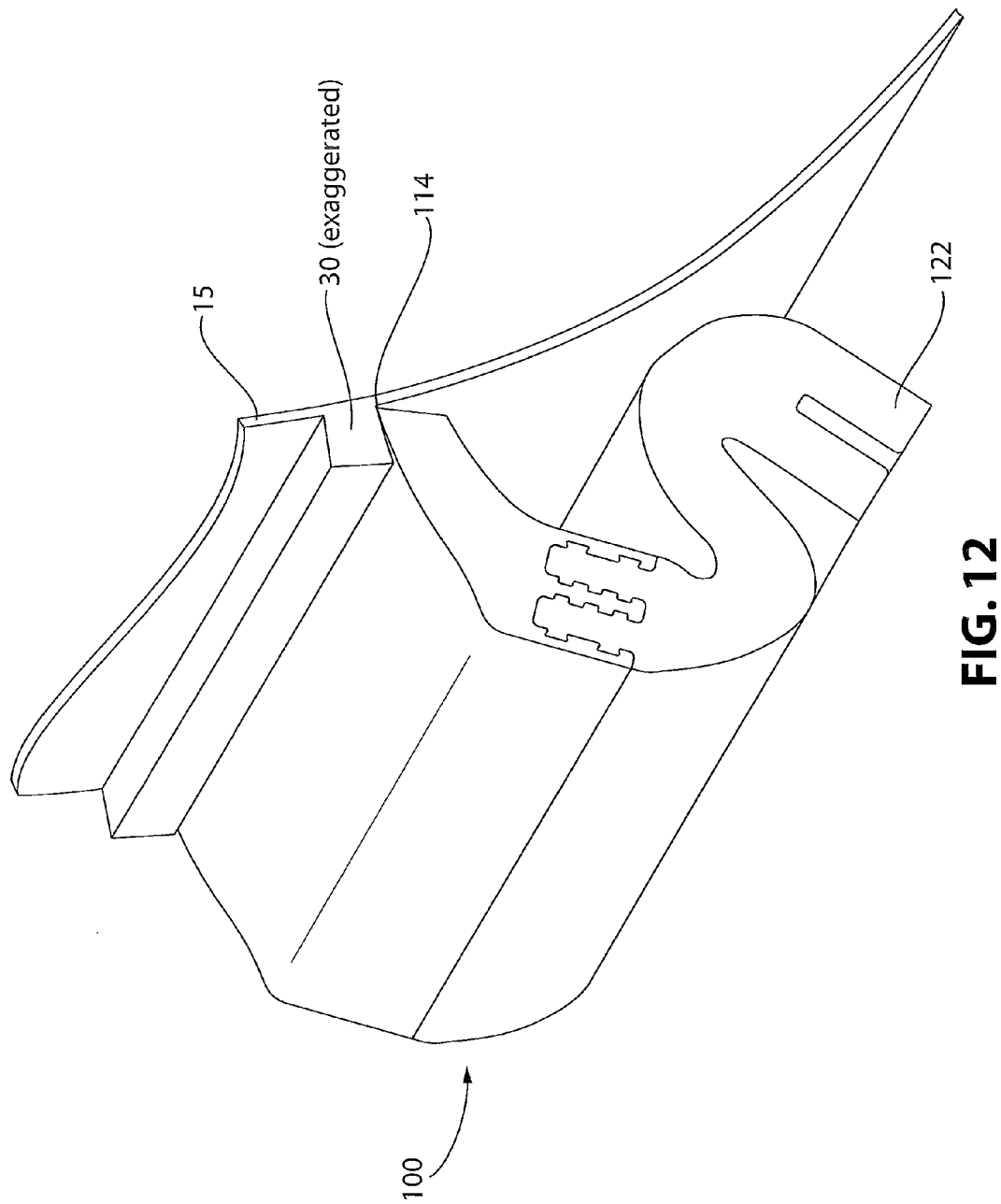
FIG. 12 is a perspective view of the arrangement illustrated in FIG. 11.

Briefly advancing to FIGS. 10 and 11, FIG. 10 illustrates the scraper blade 100 in the first position urged against the conveyor belt 15 as the conveyor belt 15 travels in direction D1. It should be noted in FIG. 10 that the conveyor belt 15 has an exaggerated obstruction 30 that will contact the scraper blade 100. One key element of the subject invention is the ability of the scraper blade 100 to recover from the introduction of such an obstruction 30 and continue to provide superior service.

In particular, FIG. 11 illustrates the scraper blade 100 in a second position, wherein the scraper tip 105 is compressed from the first position illustrated in FIG. 10 by a significant force F2 applied to the scraper edge 114 in a direction A2 generally parallel to the front face 112 of the tip 105. Under these circumstances, the base 118 deforms in a direction A2 along the front face 112 but, furthermore, and of particular importance, also deforms in a direction perpendicular to and inwardly from the front face 112 as illustrated by arrow A3 and force F3. It is this outward force F3 in the direction A3 that permits the scraper blade 100 not only to deflect to absorb the impact of the significant obstruction 30 but, furthermore, this outward component A3 allows the scraper blade 100 to distance itself from the conveyor belt 15 while the obstruction 30 passes and then returns to the first position as illustrated in FIG. 10 returning to the normal operation of clearing residual material from the conveyor belt 15 without causing damage to the conveyor belt 15.

As will be discussed, the geometry and material composition of the scraper blade 100 makes such a dynamic response. In prior scraper blade designs, the tip would not travel in the direction A3 but, would travel further along in the direction of A2 and downwardly, such that the tip 105 would essentially rotate clockwise between the remainder of the scraper blade 100 and the conveyor belt 15 and thereafter, be rendered ineffective or cause damage to the conveyor belt 15.

Directing attention to FIG. 2, the connector 208 is made up of a fin 210 connected to a tube 212, wherein the tube 212 is rotatably adjustable to angularly adjust the fin 210, thereby angularly adjusting the scraper blade 100. In general, the adjustment block 200 may adjust the rotation of the tube 212 over a 30 degree range. The adjustment block 200 has an upper portion 214 and a lower portion 215 connected by bolts 216 extending therethrough to act as a clamp on the tube 212. With the bolts 216 loosened, the tube 212 may be rotated and, therefore, the fin 210 may be rotated, thereby adjusting the orientation of the scraper blade 100 against the conveyor belt 15. This also adjusts the force F1 the scraper blade 100 exerts against the belt 15. The fin 210 fits within and is secured to the scraper blade slot 130. For additional structural integrity, rigid plates 135 are embedded within the base 118 and bolts 220 are used to secure the base 118 with the rigid plates 135 embedded therein against the fin 210.

The lateral distance between the conveyor belt 15 and the scraper blade 100 may be adjusted through the adjustment block 200. The adjustment block 200 is slidably secured to the frame 205 along horizontal grooves 227 within the frame 205. Bolts 229 extend through the adjustment block 200 and nuts 230 associated with the bolts may be loosened to slide the adjustment block 200 in the direction D2 and once properly positioned, the nuts 230 may be tightened against the bolts 229 to secure the adjustment block 200 against the frame 205. In order to minimize the space occupied by the scraper blade 100 and the adjustment block 200, it is desirable to place the adjustment block 200 as close as possible to the scraper blade 15 without compromising the efficiency of the scraper blade 100. The Applicants have found that the shape of the scraper blade 100 illustrated in FIG. 2 permits the adjustment block 200 to be moved close to the conveyor belt 15 without compromising performance. Preferably, when in the first position illustrated in FIG. 2, a line extending from the center of the anchor end 122 to the tip 105 of the scraper blade 100 forms an angle a of between 50-100 degrees and preferably 70 degrees, with a horizontal radial line H extending from the centerline 22 of the head pulley 20.

In the first position illustrated in FIG. 2, the scraper blade 100 is adjusted by the adjustment block 200 such that the lateral component F1 exerted on the conveyor belt 15 is between 1-25 pounds, and preferably between 4-10 pounds It should be appreciated that the front face 112 of the scraper blade 100 will wear away during operation and, as a result, if the original force F1 was 10 pounds against the conveyor belt 15, the design of this system is such that with the maximum permitted wear of the scraper blade 100, the force F1 will not fall below 4 pounds. This force is still sufficient to adequately clean the conveyor belt 15.

While so far discussed with respect to FIG. 2 is a single scraper blade 100, briefly returning to FIG. 1, it should be appreciated that a scraper blade system may be made up of a plurality of scraper blades 100 with each scraper blade 100 independently secured to and removable from the adjustment block 200. In this fashion, not only is it relatively easy to replace a single damaged scraper blade 100, but furthermore, the force applied by the scraper blades 100 against the conveyor belt 15 may be more closely controlled. As an example, an obstruction that engages only a single scraper blade 100 will deflect at a given load imparted by the obstruction while the remaining scraper blades 100 will operate normally. However, if the scraper blades 100 were compiled together and forced to move together, then not only would the overall deflection load be greater, but a larger section of scraper blades would be displaced away from the belt 15.

An additional benefit of the scraper blade 100 is the ability of the resilient base 118 to deflect under load. This diminishes the transmission of impact forces to the structure supporting the scraper blades 100 and thereby increases the life of the equipment.

For purposes of discussion, it should be appreciated that the scraper blade 100 will have three distinct shapes. FIG. 10 illustrates a side view of the scraper blade 100 in the relaxed position while FIG. 2 illustrates the scraper blade 100 pretensioned against the conveyor belt 15 in the normal operating condition, while FIG. 11 illustrates a side view of the scraper blade 100 in its deformed collapsed position after encountering an obstruction. In each of these three configurations, the shape deforms depending upon the forces placed upon the scraper blade 100.

Directing attention to FIG. 10, the scraper blade 100 is illustrated in the normal operating condition preset to apply a load against the conveyor belt 15.

As a general point of reference the base 118 may have a generally "S" shape and when the ends are bent, the middle portion remains generally straight. Therefore, the middle segment will be identified as having a neutral line NL for each shape of the scraper blade 100. The upper portion of the "S" shape will have a relatively rigid portion adjacent to the tip 105 and a centerline extending therethrough will be identified as UL. The lower portion of the "S" shape will have a relatively rigid portion adjacent to the anchor end 122 and a centerline extending therethrough will be identified as LL.

The concave bend 128 forms an angle X between the reference line LL and the neutral line NL of a range between 50-100 degrees and preferably around 75 degrees. However, in the relaxed state as illustrated in FIG. 5, the angle X associated with the concave bend 128 is between 75-125 degrees, preferably around 100 degrees. Therefore, the difference in the angle of the concave bend 128 between the tensioned position associated with the first position illustrated in FIG. 10 and the relaxed position illustrated in FIG. 5 is around 30 degrees. Directing attention to FIG. 11 illustrating the scraper blade 100 in the second position, the angle X of the concave bend 128 is between 5-35 degrees and preferably approximately 20 degrees. As a result, the difference between the angle X and the first position and the second position is approximately 55 degrees.

What has so far been discussed is the single concave bend 128 close to the anchor end 122 of the scraper blade 100. As illustrated in FIG. 11, the compressed concave bend 128 is capable of deflecting, such that the direction of the force F1 in direction A1, as illustrated in FIG. 2, may be completely reversed to a force F3 in a direction A3, as illustrated in FIG. 11, by the application of a force F2 vertically on the tip 105 of the scraper blade 100.

It is noted, however, that the scraper blade 100 in each configuration includes not only a concave bend 128 on the back side 126 of the base 118 but, furthermore, includes a curved profile with a concave bend 140 on the front side 124 of the base 118, which together with the concave bend 128 define a serpentine shape. As illustrated, the serpentine shape is generally in the form of an "S" having an anchor end portion 123 associated with the anchor end 122, a tip portion 106, and an intermediate portion 142, therebetween.

An angle Y formed between the reference line LL through the anchor portion 123 and the neutral line NL through the intermediate portion 142 between the first position (FIG. 10) and the second position (FIG. 11) between 40-70 degrees.

As mentioned, the scraper blade 100 has three configurations, which are the relaxed configuration, the first position against the conveyor belt, and the second position deformed from the introduction of an obstruction. In each of these configurations, each concave position collapses further with increased force.

However, observing the gross deflection of the tip 105 relative to the anchor 122, it can be appreciated how forces are applied by the scraper blade 100. A line will be drawn from the anchor end 122 to the scraper edge 114 in each position.

As a reference, FIGS. 13A, 13B, 13C, and 13D illustrate the scraper blade 100 in four different configurations. FIG. 13A, FIG. 13B, FIG. 13C, and FIG. 13D illustrate the scraper blade 100 in the relaxed state, in the first position, in the second position, and in the "breakaway" position. In each figure, a reference line R1-R4 respectively connects the center of the anchor end 122 with the scraper edge 114 to provide an appreciation of the overall deflection of the scraper blade 100 under different loads.

Figure 13B:
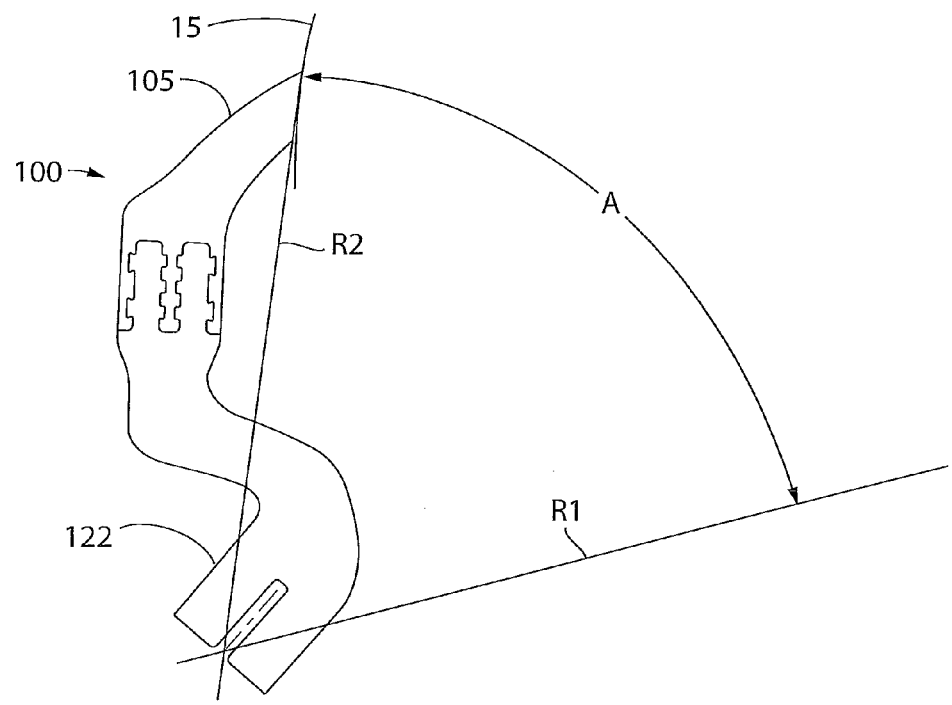
FIGS. 13A and 13B illustrate the steps necessary to pretension the scraper blade against the conveyor belt.
Figure 13A:
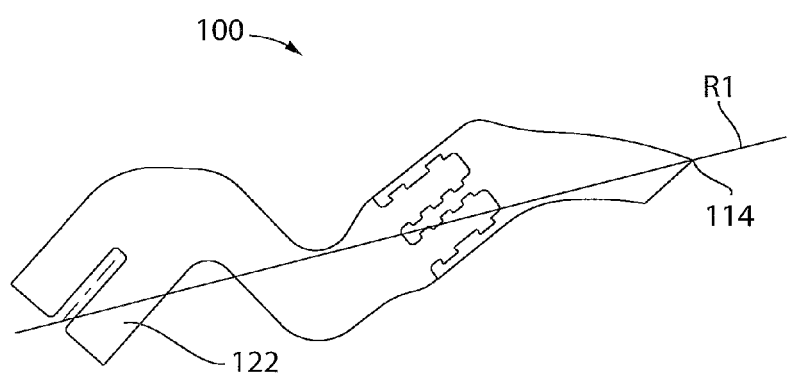
Figure 14A:
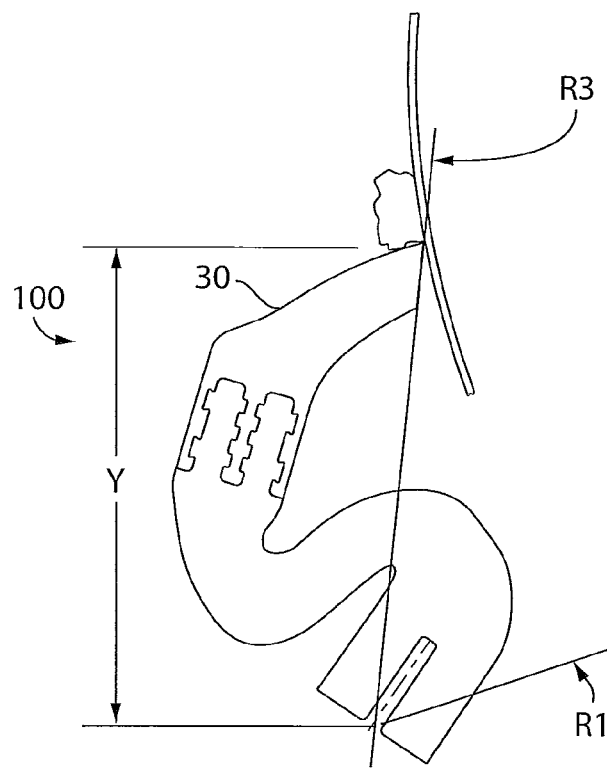
FIGS. 14A and 14B illustrate the restrained and unrestrained scraper blade as it releases from the conveyor belt upon encountering a significant obstacle.
Figure 14B:
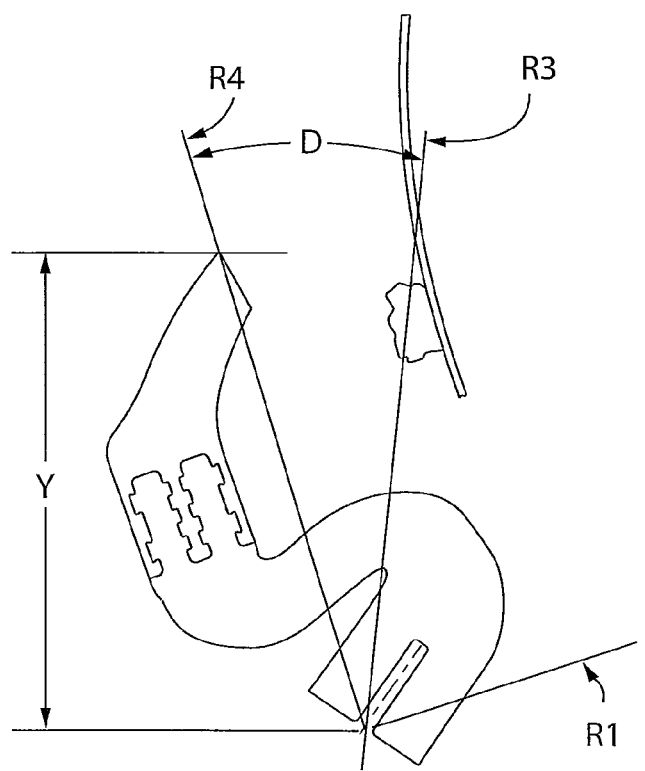
Figure 15:
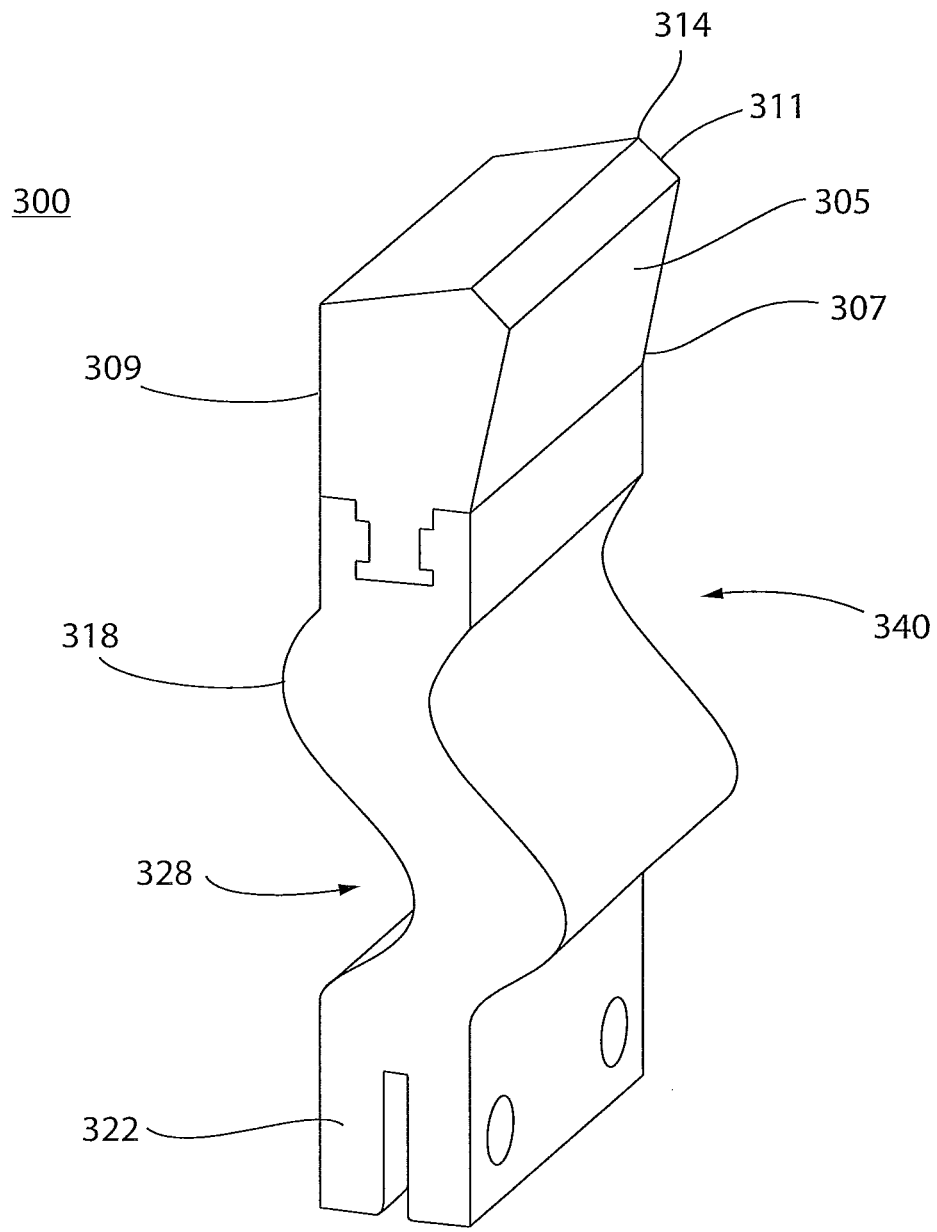
FIGS. 15-21 are a perspective view, front view, back view, right side view, left side view, top view, and bottom view, respectively, of a scraper blade in accordance with another embodiment of the subject invention.
Figure 16:
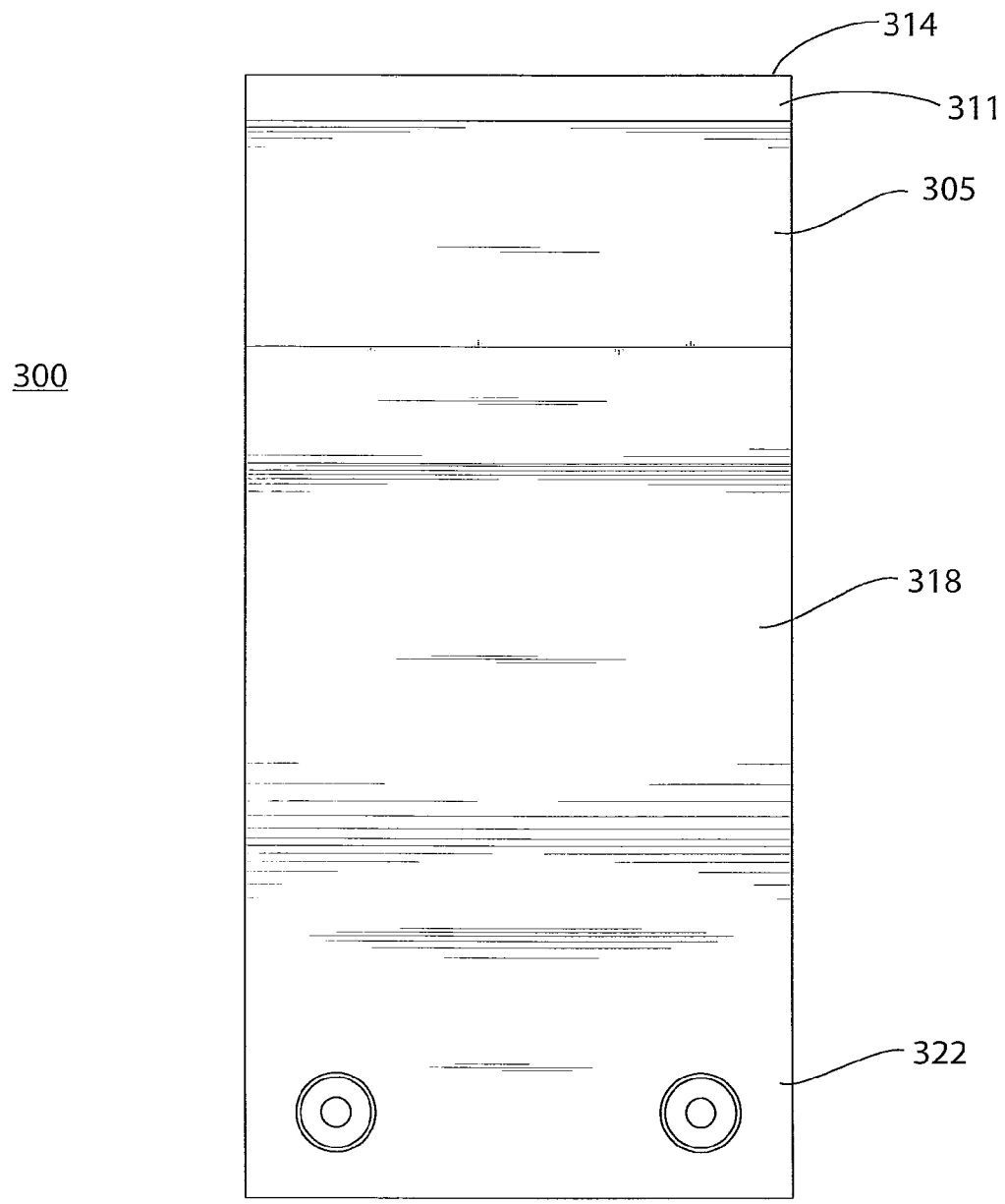
Figure 17:
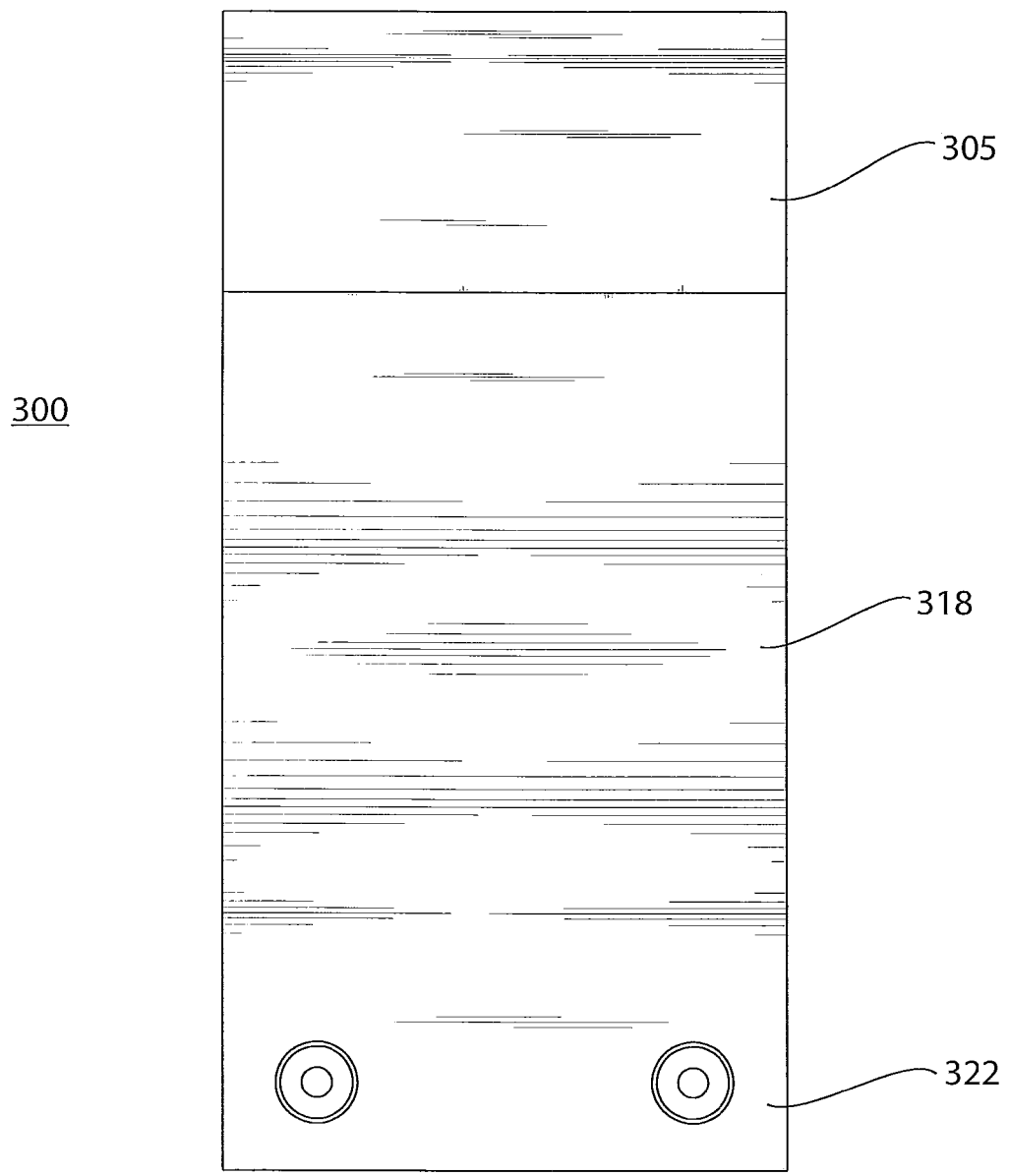
Figures 18, 19:
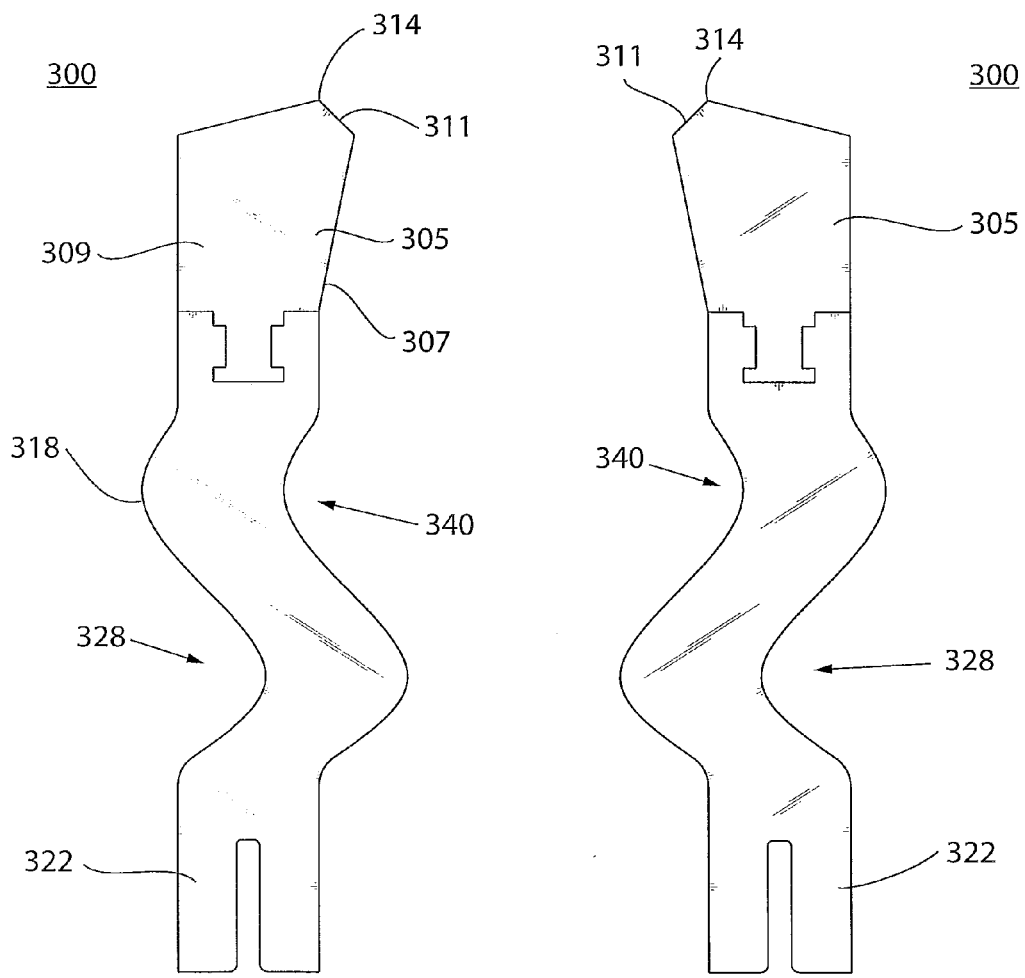
Figure 20:
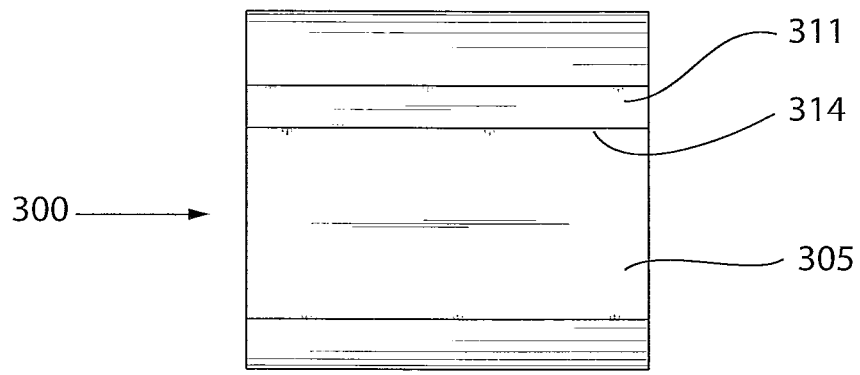
Figure 21:
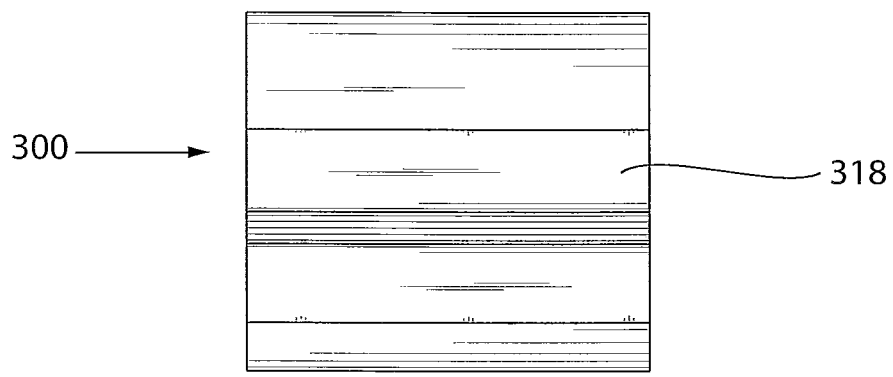

FIG. 13A illustrates a side view of the scraper blade 100 in a relaxed position. FIG. 13B illustrates a side view of the scraper blade 100 mounted for normal operation, whereby the tip 105 is applying a force to the conveyor belt 15. In FIG. 13B the anchor end 122 is fixed and the tip 105 is urged to the left such that when released, the tip 105 applies a compressive force to the conveyor belt 15. It can be seen that the tip is rotated counterclockwise at angle a of approximately 85 degrees relative to the configuration in FIG. 13A. Directing attention to FIG. 14A, the scraper blade 100 has now encountered an obstruction 30 such that the scraper blade 100 is vertically compressed and, reference line R3 connects the anchor end 122 with the edge 114. As previously discussed, the force from the scraper blade 100 against the conveyor belt 15 changes direction such that now, the tip 105 is urged away from the conveyor belt 15. To best illustrate this, FIG. 14B shows the shape the scraper blade 100 would assume if only the vertical force provided by the discontinuity 30 were applied to the tip 105 and the tip 105 was permitted to move in an unrestrained fashion along a horizontal plane. FIG. 14B shows reference line R4 and the angle D from reference line R3 showing how far from the horizontally unrestrained conveyor belt 15 the tip 105 would actually travel. It should be appreciated, however, that upon the passing of the discontinuity 30, the scraper blade 100 will resume the shape illustrated in FIG. 13B for normal operations.

As illustrated in FIG. 10, the tip 105 has a profile that will accommodate wear caused by the conveyor belt 15. In particular, as the front face 112 of the tip 105 wears, the general profile of the front face 112 is maintained. Depending upon the application, the profile of the front face 112 may be adjusted. One such adjustment may be to the thickness between the front side 107 and the back side 109.

As viewed in FIG. 10, the front face 112 of the tip 105 forms with the front side 145 of the tip 105 a positive rake angle P which may be between 50-80 degrees.

What has so far been discussed is the geometry of the scraper blade 100. However, it is important to note that the materials in the scraper blade 100 also contribute to its performance. In particular, the tip 105 is comprised of an ultra-high molecular weight polyethylene having a molecular weight of greater than 4 million. Ultra-high molecular weight polyethylene (UHMWPE) is a subset of the thermoplastic polyethylene. UHMWPE has long chains with molecular weight numbering in the millions, for example, between 3-10 million. In one example of the present invention, the UHMWPE used to form the tip 105 has a molecular weight of greater than 4 million. A longer chain UHMWPE transfers the load more effectively to the polymer backbone by strengthening intermolecular interactions. UHMWPE is highly resistant to corrosive chemicals, has extremely low moisture absorption, a very low coefficient to friction, is self lubricating, and is highly resistant to abrasion (15 times more resistant to abrasion than carbon steel).

UHMWPE is resistant to wear and impact, and has flexibility throughout a range of temperatures, for example, from −30 degrees Fahrenheit to 150 degrees Fahrenheit, or from 0 degrees Fahrenheit to 100 degrees Fahrenheit, or from 25 degrees Fahrenheit to 50 degrees Fahrenheit. Additionally, the performance of the UHMWPE tip 105 will remain unaffected with prolonged use as in the presence of the temperature and chemicals present during the operation of a conveyor system.

The use of a UHMWPE may provide the scraper with resistance to severe impact from large objects on a conveyor belt or large anchored objects on a conveyor belt. An UHMWPE is synthesized from monomers of ethylene and may include about 100,000 to 250,000 monomers.

UHMWPE may be processed using compression molding, ram extension, gel spinning, sintering, kneading, or combinations and mixtures thereof.

Additionally, the base may be comprised of one resilient material from the group of polyurethane, polymer, metal, rubber, and elastomer that provides flexibility and strength for a range of temperatures and environment. An example of a polymer suitable for use for the base 118 of the scraper blade 100 may be polyurethane. Polyurethane is defined as any polymer consisting of a chain of organic units joined by urethane (cabamate) links. Polyurethane polymers may be formed through step-growth polymerization by reacting a monomer containing at least two isocyanate functional groups with another monomer containing at least two hydroxyl (alcohol) groups in the presence of a catalyst. As a result, the polyurethane provides the base 118 with structural integrity over a wide range of temperatures such that the base 118 is able to retain its resiliency without plastic defamation, thereby enabling it to return to normal operation and to its original shape after it is deflected by an obstruction 30 (FIG. 11). The scraper blade 100 may operate in temperatures from about −32 degrees Fahrenheit to about 200 degrees Fahrenheit. Particularly with these temperatures, there may not be any significant change in physical properties of the scraper blade 100, such as elongation, flexural modulus, and/or impact strength.

Additionally, the polyurethane deflection may provide the scraper blade 100 with a relatively constant lateral force, for example, from 4-10 pounds, over a range of deflection of the scraper blade 100, for example, when the tip 105 is being worn away.

Directing attention to FIG. 4, the supportive end 115 of the tip 105 and the supporting end 120 of the base 118 are mechanically interlocked with a tongue and groove configuration 149 between the tip 105 and the base 118. FIG. 4A is an enlarged portion of the encircled portion of FIG. 4 labeled 4A. In particular, as illustrated in FIG. 4A, the tongue and groove configuration may be comprised of a plurality of laterally extending dove-tail slots 150 extending from the resilient base 118 which engages mating grooves 155 recessed within the tip 105. The slots 150 and grooves 155 extend within the tip 105 and base 118 and are oriented in a direction parallel to the reference line UL. The dove-tail slots 150/grooves 155 have wall segments 152, 157 oriented at an angle Z of between 40-60 degrees with respect to reference line UL extending through the supporting end 120 of the base 118.

As illustrated in FIG. 4, there are at least three pairs of interlocking slots 150 and grooves 155 to provide integrity to the connection between the tip 105 and the base 118. While dove tail slots 150/grooves 155 provide superior gripping, a general tongue and groove arrangement, also illustrated in FIG. 4, may also be sufficient to retain the tip 105 and the base 118.

As previously discussed and with attention directed to FIG. 2, the scraper blade 100 further includes a slot 130 extending upwardly from the anchor end 122 adapted to accept a fin 210 to secure the scraper blade 100 to the adjustment block 200.

While the polyurethane material of the resilient base 118 may be secured to the adjustment block 200 using bolts, it is preferred to reinforce the resilient base 118 with rigid plates 135 embedded within the base 118. Through the plates are apertures which align with apertures 221 extending through the anchor end 122 of the scraper blade 100. Bolts 220 extend through these aligned apertures to secure the scraper blade 100 to the fin 210 which itself is secured to the adjustment block 200. These rigid plates 135 may be steel.

FIGS. 15-21 illustrate a perspective view, front view, back view, right side view, left side view, top view, and bottom view of an alternate embodiment of the subject invention incorporating a serpentine profile with a modified tip. For convenience, similar parts to the scraper blade 100 previously discussed are identified using reference numbers incremented by 200. While this design may be suitable for removing residual material from a conveyor belt, the embodiment discussed earlier provides additional benefits not provided by this embodiment. In particular, the more aggressive serpentine profile provides a more compact arrangement, while at the same time, provides a greater kick-out force when the tip is compressed by an obstruction. Nevertheless, the claims of the subject invention are also directed to this embodiment. Briefly summarizing, the scraper blade 300 illustrated in FIGS. 15, 16, and 17 include a tip 305 having a front side 307 and a back side 309 with a scraper edge 314 having a front face 312. The tip 305 is attached to the resilient base 318 having the generally serpentine arrangement previously described, however as seen, the concave bend 328 and the concave bend 340 form angles that are less aggressive than those described in the previous embodiment. The anchor end 322 of the scraper blade 300 may be secured to an adjustment block similar to that adjustment block 200 previously described. In order to mount the scraper blade 300 against the conveyor belt, it is necessary to mount the anchor end 322 a further lateral distance from the conveyor belt than that of the previous embodiment because of its less compact arrangement. The materials of the scraper blade 300 are identical to those materials previously described with respect to scraper blade 100.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. A scraper blade comprising:
   a) a tip having a front face with a scraper edge, an opposing supported end, a front side, and a back side;
   b) a resilient base attached to the tip, wherein the base has a supporting end, an anchor end, a front side, and a back side, wherein, in a relaxed state a reference line extends from the anchor end of the base to the scraper edge;
   c) wherein the base has a curved profile with a concave bend on the back side adjacent to the anchor end of the base;
   d) wherein in a first position, the scraper tip is rotated a predetermined amount relative to a fixed anchor end, such that the resilient base is deformed and the tip exerts a force in a first direction generally perpendicular to and outwardly from the front face;
   e) wherein in a second position, the scraper tip is compressed from the first position with a force applied to the tip in a direction generally parallel to the front face of the tip, such that the base deforms in a direction along the front face and also deforms in a direction perpendicular to and inwardly from the front face.

2. The scraper blade according to claim 1, wherein the concave bend forms an arc with an angle from the first position to the second position of between 10-85 degrees.

3. The scraper blade according to claim 1, further including a curved profile with a concave bend on the front side of the base, thereby defining a serpentine shape.

4. The scraper blade according to claim 3, wherein the serpentine shape is generally in the form of an S having an anchor end portion, a tip portion, and intermediate portion therebetween.

5. The scraper blade according to claim 4, wherein the anchor end portion and intermediate portion between the first position and the second position form an angle between 10-85 degrees with one another.

6. The scraper blade according to claim 5, wherein the tip end portion and intermediate portion between the first position and the second position form an angle between 35-125 degrees with one another.

7. The scraper blade according to claim 1, wherein the front side and the back side of the tip taper away from one another as they extend away from the scraper edge, such that, as the front face wears, the front face has a greater surface area.

8. The scraper blade according to claim 1, wherein the front face of the tip forms with the front side of the tip a positive rake angle.

9. The scraper blade according to claim 8, wherein the rake angle is between 50-80 degrees.

10. The scraper blade according to claim 1, wherein the tip is comprised of an ultra-high molecular weight polyethylene.

11. The scraper blade according to claim 10, wherein the ultra-high molecular weight is greater than 4 million.

12. The scraper blade according to claim 1, wherein the base is comprised of one resilient material from the group of polyurethane, polymer, metal, rubber, and elastomer.

13. The scraper blade according to claim 1, wherein the supported end of the tip and the supporting end of the base are mechanically interlocked with tongue and groove configurations between the two parts.

14. The scraper blade according to claim 13, wherein the tongue and groove configuration is comprised of a plurality of laterally extending dovetail slot/groove connections between the tip and the base oriented in a direction parallel to the scraper edge.

15. The scraper blade according to claim 14, wherein the dovetail slots/grooves have wall segments angled between 40-60 degrees with respect to the scraper sides.

16. The scraper blade according to claim 15, wherein there are at least 3 pairs of interlocking slots/grooves to provide integrity to the connection between the tip and the base.

17. The scraper blade according to claim 13, further including a slot extending upwardly from the base end portion adapted to accept a fin therein to secure the scraper blade to the adjustment block.

18. The scraper blade according to claim 17, further including at least one rigid plate embedded within the base with apertures extending therethrough to accommodate bolts used to secure the scraper blade to a holder.

19. The scraper blade according to claim 18, wherein the rigid plate is steel.

20. A scraper blade system for removing residual material from a conveyor belt at the head pulley comprising:
   a) at least one scraper blade having:
      i) a tip having a front face with a scraper edge, an opposing supported end, a front side, and a back side;
      ii) a resilient base attached to the tip, wherein the base has a supporting end, an anchor end, a front side, and a back side, wherein, in a relaxed state a reference line extends from the anchor end of the base to the scraper edge;
      iii) wherein the base has a curved profile with a concave bend on the back side adjacent to the anchor end of the base; and
      iv) a slot extending through the anchor end;
   b) an adjustment block mounted to a frame, wherein the block has a connector extending therefrom which engages and supports at least one scraper blade, wherein the connector positions each scraper blade tip against the belt at the head pulley and is angularly adjustable such that each scraper blade may be rotated to urge the scraper blade against the belt;
   c) wherein in a first position, each scraper blade is rotated a predetermined amount relative to a fixed anchor end such that the resilient base is deformed and the tip exerts a force in a first direction generally perpendicular to and outwardly from the front face; and
   d) wherein in a second position, each scraper tip is compressed from the first position with a force applied to the tip in a direction generally parallel to the front face of the tip such that the base deforms in a direction along the front face and also deforms in a direction perpendicular to and inwardly from the front face.

21. The scraper blade system according to claim 20, wherein the connector comprises a rotatable tube to angularly adjust each scraper blade.

22. The scraper blade system according to claim 21, wherein the rotatable tube may be rotated within a 20 degree range.

23. The scraper blade system according to claim 21, wherein the rotatable tube has extending radially therefrom at least one wing that is engaged by an adjustment bolt engaged in the adjustment block to selectively rotate the tube and fin, thereby adjusting the force each scraper blade exerts against the belt.

24. The scraper blade system according to claim 23, wherein the tube has extending radially therefrom a fin which fits within the scraper blade slot and is secured to each scraper blade.

25. The scraper blade system according to claim 20, wherein the adjustment block is slidably mounted to the frame such that the angle between the anchor end of the scraper blade and the point at which the scraper blade tip contacts the belt may be adjusted.

26. The scraper blade system according to claim 20, wherein the scraper blade in the first position is angularly adjusted such that the lateral component of the force exerted on the belt is between 1-25 pounds into the belt.

27. The scraper blade system according to claim 26, wherein the scraper blade is angularly adjusted such that the lateral component of the force exerted on the belt is between 4-10 pounds into the belt.

28. The scraper blade system according to claim 26, wherein in the second position the direction of the lateral component of the force is reversed and is directed away from the belt.

29. The scraper blade system according to claim 20, wherein there are at least two scraper blades associated with the block and each scraper blade is independently secured to and removable from the block.

30. A scraper blade for removing residual material from a conveyor belt, wherein the blade is comprised of:
 a) a tip having a front face with a scraper edge, an opposing supported end, a front side, and a back side;
 b) a resilient base attached to the tip, wherein the base has a supporting end, an anchor end, a front side, and a back side;
 c) wherein the base has a serpentine profile with a concave bend on the back side adjacent to the anchor end of the base and a concave bend on the front side adjacent to the tip; and
 d) wherein the front side and the back side of the tip taper away from one another as they extend away from the scraper edge, such that as the front face wears, the front face has a greater thickness.

31. The scraper blade according to claim 30, wherein the serpentine shape is generally in the form of an S.

32. The scraper blade according to claim 30, wherein the front face of the tip forms with the front side of the tip a positive rake angle.

33. The scraper blade according to claim 32, wherein the rake angle is between 50-80 degrees.

34. The scraper blade according to claim 30, wherein the tip is comprised of an ultra-high molecular weight polyethylene.

35. The scraper blade according to claim 34, wherein the ultra-high molecular weight is greater than 4 million.

36. The scraper blade according to claim 30, wherein the base is comprised of one resilient material from the group of polyurethane, polymer, metal, rubber, and elastomer.

37. A scraper blade system for removing residual material from a conveyor belt at the head pulley comprising:
 a) at least one scraper blade having:
  i) a tip having a front face with a scraper edge, an opposing supported end, a front side, and a back side;
  ii) a resilient base attached to the tip, wherein the base has a supporting end, an anchor end, a front side, and a back side, wherein, in a relaxed state a reference line extends from the anchor end of the base to the scraper edge;
  iii) wherein the base has a curved profile with a concave bend on the back side adjacent to the anchor end of the base; and
  iv) a slot extending through the anchor end;
 b) an adjustment block mounted to a frame, wherein the block adjusts the rotation of the scraper blade and thereafter holds the scraper blade non-rotatable with respect to the block such that each scraper blade may be rotated to a predetermined rotational position to urge the scraper blade against the belt;
 c) wherein in a first position, each scraper blade is rotated a predetermined amount relative to a fixed anchor end such that the resilient base is deformed and the tip exerts a force in a first direction generally perpendicular to and outwardly from the front face; and
 d) wherein in a second position, each scraper tip is compressed from the first position with a force applied to the tip in a direction generally parallel to the front face of the tip such that the base deforms in a direction along the front face and also deforms in a direction perpendicular to and inwardly from the front face.

* * * * *